UNITED STATES PATENT OFFICE.

HENRY DREYFUS, OF LONDON, ENGLAND.

MANUFACTURE OF SOLUTIONS, COMPOSITIONS, OR PREPARATIONS HAVING A BASIS OF ACETATE OF CELLULOSE.

1,363,763.     Specification of Letters Patent.     Patented Dec. 28, 1920.

No Drawing.     Application filed July 7, 1919. Serial No. 309,198.

*To all whom it may concern:*

Be it known that I, HENRY DREYFUS, of London, England, have invented certain new and useful Improvements in the Manufacture of Solutions, Compositions, or Preparations Having a Basis of Acetate of Cellulose, of which the following is a specification.

This invention has reference to the manufacture of dopes, solutions, compositions or preparations having a basis of acetate of cellulose, and is applicable in particular to cases where such solutions or preparations are employed for doping balloon or other aircraft fabrics or aircraft components, or for other coatings, or the manufacture of films, but it is also applicable in other cases, such as the manufacture of artificial silk and the like, or the production of articles or objects from masses having a basis of acetate of cellulose, or for other purposes.

Solutions, compositions or preparations of cellulose acetate such as referred to, usually comprise one or more volatile solvents or diluents such as acetone, alcohol-benzene and so forth, together with other solvents or media (so-called plastifying agents) having a high boiling point, the solvents or diluents of low boiling point being allowed or caused to evaporate after the application of the dope or solution or the formation of the film or other article or object, while the other solvents or media evaporate or are evaporated more slowly or even not at all, according to the temperatures to which they are exposed and the nature of the product.

The difficulty which is experienced generally with these dopes, preparations or compositions is that by the rapid evaporation of the liquids of low boiling point (*i. e.* below the boiling point of water) and of the cooling effect caused thereby, condensation of the humidity contained in the air takes place on the dope, coating, film or the like, so that the same "whitens" and more or less loses its coherence, inasmuch as the coating, film or the like so obtained has not the same strength, as the volatile solvent escapes irregularly between the particles during the evaporation, owing to the water condensed thereon.

I have found that it is possible to avoid such condensation or to obviate its effects by employing—either with or without such volatile solvents or diluents as before referred to—solvents having a higher boiling point than water, but lying between 100° and about 150° C. By this means regular and satisfactory evaporation can be obtained and condensation of water from the atmosphere can be prevented or reduced, and even if some condensation of moisture takes place, this water evaporates before the formation of the coating, film or the like is finished, so that during the formation of the coating, film or the like, a real solvent is present, which allows of obtaining strong films, coatings or surfaces and of avoiding "whitening" and deterioration thereof.

Such solvents of boiling points between 100° and about 150° C. must, however, not only be real solvents of the cellulose acetate, but must also be quite neutral, *i. e.* neither acid nor alkaline nor liable to become so under atmospheric influences, they should be non-poisonous and not liable to be saponified, and further they should be miscible with the usual volatile solvents or diluents.

Various solvents having boiling points lying within this range of 100° and about 150° C. have been proposed for cellulose acetates. Of these some, such as acetic acid, are acids and saponifiable. Others, such as ethyl lactate or other esters of lactic acid are not neutral and are saponifiable. Others again, such as tetrachlorethane are of a poisonous character and objectionable on account of their odor. Amyl alcohol, which has also been proposed, is not a solvent of cellulose acetate, but rather a precipitant.

I have previously proposed certain solvents having boiling points within the range in question and possessing the requisite properties, for example in my French Patent of Addition No. 19680 of 4 March 1914 I have proposed to employ cyclo compounds such as cyclo hexanone (B. P. 155° C.) and its homologues such as methyl-cyclo-hexanone, and dimethyl-cyclo-hexanone, and dimethyl-cyclo-hexanone, and so forth.

I have now found that acetyl acetone and ethylidene acetone or mixtures thereof possess all the properties above set forth as requisite for the purposes indicated, and according to the present invention I employ either of these substances, or their mixtures, as solvents for cellulose acetates in such solutions, compositions or preparations as above referred to, either with or without the use of volatile solvents.

Acetyl acetone ($CH_3.CO.CH_2.CO.CH_3$) is a body having a boiling point of 137° C. Ethylidene acetone ($CH_3.CH=CH.CO.CH_3$) is a body having a boiling point of 122° C. Both these substances possess the following advantages for the applications in question. They are true solvents for cellulose acetates, neither acid nor alkaline in character nor liable to become so under atmospheric influences, non-poisonous, and not liable to be saponified; they are miscible with the usual volatile solvents or diluents, and with or without these latter they allow of attaining regular and satisfactory evaporation of the coatings, films or compositions, without "whitening" and loss of cohesion occurring as the result of condensation of atmospheric moisture on the surface during evaporation, so that good and strong films, coatings or surfaces can be obtained.

The acetyl acetone or ethylidene acetone, or any mixture thereof, may be added to the components of any known cellulose acetate dope, solution, composition or preparation in any suitable proportion, or can be used alone as the solvent or medium for the cellulose acetate, though it is chiefly intended for use together with volatile solvents or diluents such as referred to.

By way of example the acetyl acetone or ethylidene acetone may be added or employed in proportions of about 10% to 100% relatively to the cellulose acetate present or employed.

The following examples will serve to illustrate the invention, it being understood that these are given by way of illustration only, and are in no way limitative. The parts are by weight.

*Example 1. Dope or coating solution for balloon or aeroplane fabrics, etc.*

Cellulose acetate_____ 100 parts.
Acetyl acetone or ethylidene acetone 50-100 parts, together with volatile solvent such as alcohol benzene mixture or acetone, in quantity making together with the acetyl acetone or ethylidene acetone _____ 88-1550 parts.
Triphenyl phosphate_____ 16-17 parts.

*Example 2. Film composition.*

Cellulose acetate_____ 100 parts.
Acetone or methyl acetate_about 900 parts.
Triphenyl phosphate_____ 12 parts.
Orthophthalic methyl ester_____ 12 parts.
Ethylidene acetone or acetyl
   acetone _____ 50-100 parts.

It is to be understood that the invention includes the employment of acetyl acetone or ethylidene acetone or their mixtures, generally as a solvent or medium in the manufacture or application of cellulose acetate dopes, films, celluloid-like masses, artificial silk or other preparations or compositions, and that other solvents or liquids of higher boiling points or so-called plastifying agents can also be employed, in conjunction with them, and any other substances such as are known or used in making dopes, solutions, films, artificial threads, celluloid-like masses or other preparations or compositions with cellulose esters may also be employed with them.

I have found that ethylidene acetone or a mixture of this with acetyl acetone is the equivalent of acetyl acetone in the composition defined in the following claims, and such equivalents are intended to be embraced within the scope thereof.

What I claim and desire to secure by Letters Patent is:—

1. A composition of matter comprising cellulose acetate and acetyl acetone as a solvent of the cellulose acetate.

2. A composition of matter comprising cellulose acetate, acetyl acetone as a solvent of the cellulose acetate and a volatile liquid solvent or diluent.

3. A composition of matter comprising cellulose acetate, acetyl acetone as a solvent of the cellulose acetate, a volatile liquid solvent or diluent and a higher boiling solvent or plastifying agent.

In testimony whereof I have hereunto subscribed my name.

HENRY DREYFUS.

It is hereby certified that in Letters Patent No. 1,363,763, granted December 28, 1920, upon the application of Henry Dreyfus, of London, England, for an improvement in "Manufacture of Solutions, Compositions, or Preparations Having a Basis of Acetate of Cellulose," errors appear in the printed specification requiring correction as follows: Page 1, lines 99–100, strike out the words "and dimethyl-cyclo-hexanone," second occurrence; page 2, line 51, for "88" read *884;* and that the said Letters Patent should be read with these corrections therein that the same may conform to the record of the case in the Patent Office.

Signed and sealed this 25th day of January, A. D., 1921.

[SEAL.]

L. B. MANN,

*Acting Commissioner of Patents.*

Cl. 134—79.